Figure 1:
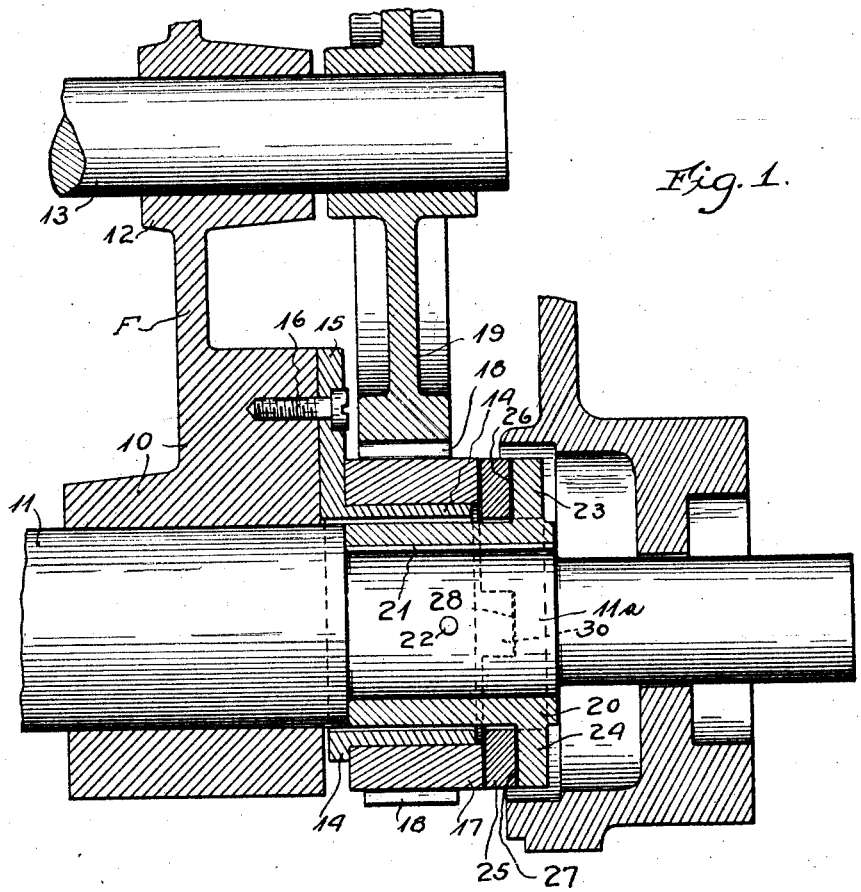

Inventor,
Arthur W. Pope Jr.
By Braun, Boettcher & Druner
Attys.

Patented July 2, 1929.

1,719,307

UNITED STATES PATENT OFFICE.

ARTHUR W. POPE, JR., OF WAUKESHA, WISCONSIN, ASSIGNOR TO WAUKESHA MOTOR COMPANY, OF WAUKESHA, WISCONSIN, A CORPORATION OF WISCONSIN.

TIMING-GEAR SUPPORT.

Application filed July 21, 1926, Serial No. 123,969. Renewed May 25, 1928.

My invention relates to a timing gear arrangement in connection with an internal combustion engine.

When the crank shaft gear of a timing train is mounted rigidly on the crank shaft, its teeth will be unduly stressed and strained because it is subjected to the motion of the crank shaft as the crank shaft flexes under load. The object of my invention is therefore to provide an improved support for the crank shaft timing gear so that such gear may maintain the proper meshing engagement with a companion gear entirely independently of crank shaft flexures or deflections under load. To accomplish this, I journal the crank shaft timing gear on a bearing structure which surrounds the crank shaft but does not engage therewith, and by means of a flexible coupling I then connect this gear in driving relationship with the crank shaft.

Figure 2:
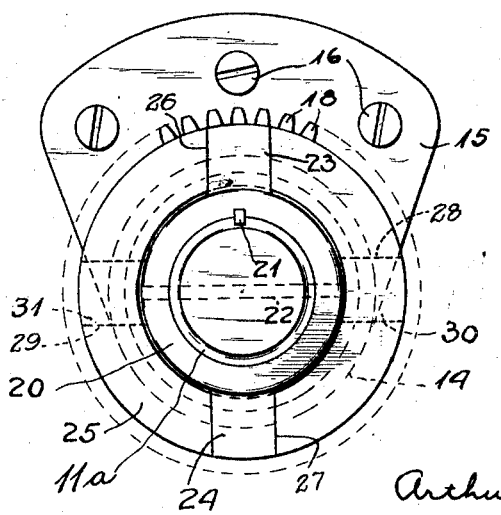

On the drawing:

Figure 1 is a diametral sectional view at the end of the crank shaft showing the timing gear and coupling mechanism; and Fig. 2 is an end view showing the gear and coupling mechanism.

On the the drawing, F represents the engine frame; 10 is the end bearing for the crank shaft 11; and 12 represents the end bearing for the cam shaft 13. Surrounding the crank shaft outside of the bearing 10 is the bearing hub 14 whose inner diameter is greater than the crank shaft's diameter so that the hub will not touch the crank shaft. The hub has a flange 15 whereby it is secured to the frame F by means of screws 16. On the hub 14 is journaled the timing gear 17 whose teeth 18 mesh with the teeth of the gear 19 on the cam shaft, the axis of the hub being parallel with the axis of the cam shaft.

On the reduced end 11$^a$ of the crank shaft is the coupling member 20 which is securely held on the shaft as by means of a key 21 and a pin 22. The coupling member has diametrally opposite coupling tongues 23 and 24 which are opposite to but spaced away from the body of the gear 17. Surrounding the coupling member 20 is the coupling ring 25 preferably of non-metallic material such as bakelite or fibre. The internal diameter of this ring is somewhat greater than the external diameter of the member 20, and in its outer side the ring has the notches 26 and 27 receiving the tongues 23 and 24 respectively. On the inner side of the ring and spaced 90 degrees from the notches 26 and 27, the ring has the notches 28 and 29 which receive the tongues 30 and 31 extending axially from the body of the gear 17. As the crank shaft turns, the coupling member 20 transmits the rotation thru the coupling ring 25 to the gear 17 whose rotation is transmitted by the gear 19 to the cam shaft 13. On account of its greater diameter the coupling ring may shift radially, and it also has sufficient axial clearance between the coupling member 20 and the gear so that altho the crank shaft may be flexed and deflected during operation of the engine, the yielding coupling connection will cause the gear to be accurately rotated on its bearing hub 14 without any strain on the bearing hub or gear and the gear teeth will always be in true accurate mesh with the driven gear connected with the cam shaft. The flexible coupling shown is of the well known Oldham type, but it is understood that other forms of flexible couplings could be utilized for connecting the crank shaft with the timing gear.

I thus provide a simple and effective arrangement in which the crank shaft timing gear is driven by the crank shaft but independently of and uninfluenced by any flexure, deflection or other distortion of the crank shaft during operation of the engine.

I claim as follows:

1. In an internal combustion engine, the combination of a crank shaft, a cam shaft, a frame journaling said shafts, a bearing hub surrounding but not touching said crank shaft, the axis of said bearing hub being substantially parallel with the axis of said cam shaft, a timing gear journaled on said bearing hub and supported independently of said crank shaft, a transmitting gear meshing with said timing gear and connected with said cam shaft, and a flexible coupling connecting said crank shaft with said timing gear to cause rotation of said gear independently of distortion of said crank shaft during operation of the engine, the meshing position of said gears remaining unchanged.

2. In an internal combustion engine, the combination of a crank shaft, a bearing therefor, a bearing hub surrounding but separated by a clearance space from said crank shaft, a gear journaled on said bearing hub, a driving member secured to said shaft, and a coupling member between said driving member and the end of said gear having yielding connection with said coupling member and said gear, whereby said gear will be rotated independently of distortion of said crank shaft.

3. In an internal combustion engine, the combination of a crank shaft, a bearing for said crank shaft, a bearing hub separated by a clearance space from said shaft and normally concentric therewith, a member to be driven journaled on said bearing hub, a driving member secured to said shaft, and a coupling member between said driving member and said member to be driven and having yielding connection with said coupling member and said member to be driven whereby said member to be driven will be rotated independently of distortion of said crank shaft.

4. In combination in an internal combustion engine, a cam shaft, a crank shaft, a bearing hub disposed about the crank shaft in substantially concentric spaced relation thereto, said hub being secured to the engine frame above the crank shaft, a gear rotatably mounted on the hub, a flexible driving connection between said gear and the crank shaft, and a gear secured on the cam shaft and meshing with the gear on said hub.

In witness whereof, I hereunto subscribe my name this 15 day of July, 1926.

ARTHUR W. POPE, Jr.